United States Patent

[11] 3,623,131

| [72] | Inventor | Carl D. Russell<br>1502 South Boulder St., Tulsa, Okla. 74119 |
|---|---|---|
| [21] | Appl. No. | 38,693 |
| [22] | Filed | May 19, 1970 |
| [45] | Patented | Nov. 23, 1971 |

[54] COMBINATION TIME DELAY AND SELF-ACTUATING VOLTAGE LEVEL PROTECTIVE CIRCUIT FOR VEHICULAR ELECTRICAL SYSTEMS
18 Claims, 1 Drawing Fig.

[52] U.S. Cl. ................................................ 307/10 BP,
317/31, 315/83
[51] Int. Cl. ................................................ H02h 3/24
[50] Field of Search .......................................... 307/10 R,
10 BP; 317/31; 315/77, 80, 82, 83; 320/40

[56] References Cited
UNITED STATES PATENTS

| 3,211,951 | 10/1965 | Skinner | 307/10 BP |
| 3,374,394 | 3/1968 | Miller | 307/10 BP |
| 3,388,288 | 6/1968 | Kibler | 315/82 |
| 3,395,288 | 7/1968 | Von Brimer | 307/10 BP |
| 3,474,296 | 10/1969 | Rickey | 317/31 |
| 3,476,975 | 11/1969 | Brock | 315/83 |
| 3,462,647 | 8/1969 | Russell | 320/33 X |

*Primary Examiner*—J. D. Miller
*Assistant Examiner*—Harvey Fendelman
*Attorney*—Wilfred G. Caldwell ABSTRACT: The invention resides in a modification of the vehicular electrical system to include a protected time delay circuit for maintaining the lights or the like on for a predetermined period after initiation, and a voltage-sampling interrupter for interrupting the electrical system when the battery voltage decays to a predetermined level if the lights or other load have been inadvertently left on or short-circuited.

PATENTED NOV 23 1971
3,623,131
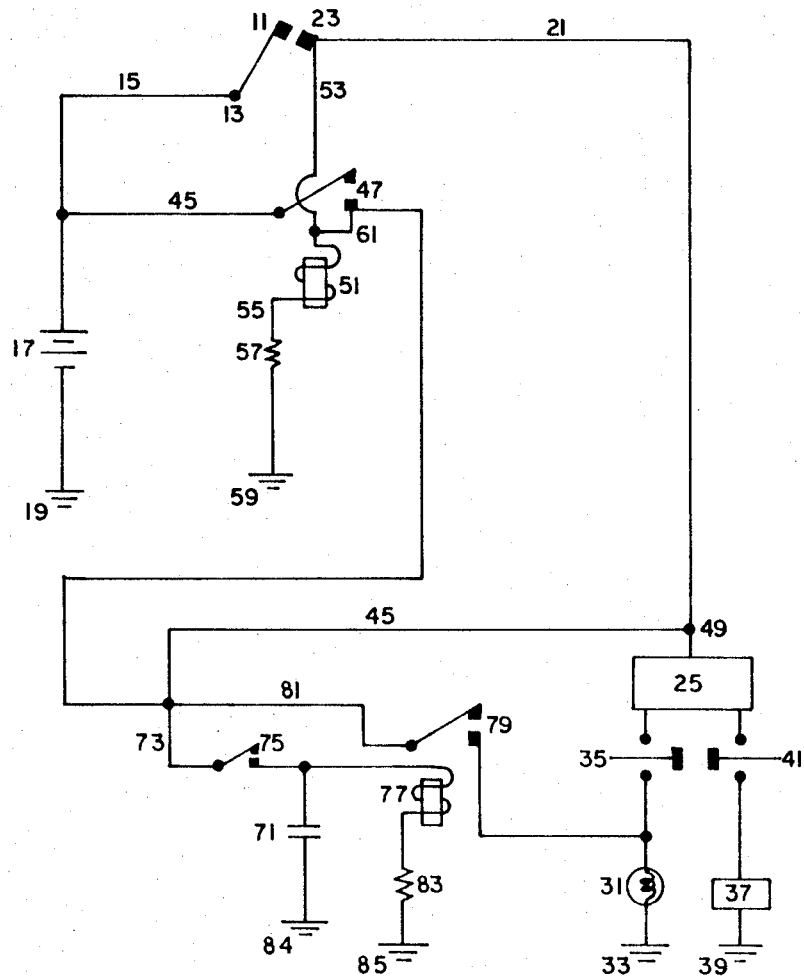
INVENTOR.
BY

COMBINATION TIME DELAY AND SELF-ACTUATING VOLTAGE LEVEL PROTECTIVE CIRCUIT FOR VEHICULAR ELECTRICAL SYSTEMS

The present invention comprises an inexpensive apparatus for achieving the functions of protection of a vehicular battery at a predetermined minimum voltage level and the maintaining of a load active, such as the vehicular lights, for a predetermined time after initiation, for example, to allow the person safely to exit from the vehicle and enter his house or other building.

Both functions are achieved through a unique power and sensing circuit for the accessory loads, which circuit is basically bypassed by a circuit from the On position of the ignition switch to the accessory loads thereby ensuring that during operation of the vehicle there is always at least one connection to the loads, but once the ignition is off there is maintained a sensing and protective power circuit for interrupting the voltage supply at a fixed level in the event of a short circuit or other battery drain.

Because of the unique power and sensing circuit, the accessory position and attendant contacts and wiring may be omitted from the ignition switch, if desired. An added direct connection or circuit from the ignition On contact is extended to the fuse box (or common lead) for all of the vehicle accessory loads to serve as the definite lead during operation of the vehicle.

The protective sensing connection extends from the battery to the fuse box for sensing any battery drain and initiating disconnecting action at the predetermined level. A pair of contacts in the power-sensing circuit are subsequently opened to achieve disconnect when the vehicle battery decays to, for example 12.8 volts on certain makes of vehicles or to voltage levels as high as 14 or 15 volts on other makes of vehicles but in any event to a level which is still sufficient to start the car. (Actually fully charged so-called 12-volt vehicle batteries range from approximately 14 to 18 volts and their levels must be maintained above their rating for effective operation.) These contacts also serve as holding contacts for the voltage-sensing relay and when the voltage decays to a point that the relay drops out these holding contacts open the sensing and power circuit to preserve the battery energy.

The timing circuit is effective above the predetermined voltage and may be initiated by the vehicle operator, as desired. It comprises a capacitor instantly chargeable to the battery voltage when a pushbutton is depressed and, upon release of the pushbutton, it discharges into a relay coil which closes a set of contacts to apply the battery voltage to, for example, the lights, and this battery voltage is applied so long as the relay holds the contacts closed due to the capacitor discharge.

The optional inclusion of a low-value adjustable resistor in series with this relay coil permits the RC time constant to be adjusted. The battery voltage applied to the circuit is derived via the combination holding and sensing contacts of the sensing power circuit for two reasons. The first is so the timing circuit will not be operated if the voltage is at or below the protected level to cause further drain, and the second is to enable the protective circuit to protect against any possible malfunctions in the timing circuit.

While the RC timing circuit is much more reliable than the thermal or bimetalic strip-type timing circuits in current use on vehicles, nevertheless the protection is highly desirable in order that the entire vehicle electrical system is safeguarded.

Other accessories could be connected to the timing circuit as, for example, the horn if it were desired to pin the horn button down and leave the vehicle under certain types of emergencies. This is possible because the timing circuit bypasses the individual accessory switches and extends directly to the individual load—the lights, for example.

It may now be appreciated that either function can be achieved independently if supervision of the timing circuit is not desired.

It should be borne in mind, however, that the timing circuit establishes a path from the battery directly to the lights, whereas the sensing circuit establishes a path from the battery directly to the fuse box or any other lead that is common for supplying B+ to the accessories.

Accordingly with the foregoing in mind, it is an object of the invention to provide a voltage-sensing circuit for breaking the power connections in a vehicle electrical system when the vehicle electrical voltage source has decayed to a predetermined level.

Another object of the invention is the provision of a timing circuit, actuable by the operator of a vehicle, to maintain an accessory in operative or On condition for a predetermined period of time.

It is a further object of the invention to provide a combination voltage protecting and supervising timing circuit for use in a vehicle electrical system.

A still further object of the invention is the provision of such additional circuitry which may be continuously operative to sense the voltage level without substantial drain on the battery.

Yet another object of the invention is the provision of a timing circuit for use in a vehicle electrical system which employs capacitor discharge for determining a predetermined timing interval.

The invention will be further described in connection with the preferred embodiment thereof shown in the attached drawing wherein:

The FIGURE is an electrical circuit-type illustration showing the present invention.

In the FIGURE the ignition switch includes contact member 11 connected from pivot point 13 over lead 15 to the vehicle battery 17 which is in turn grounded at 19. This circuitry is found in the typical vehicle. However, the short circuit connection 21 from On contact 23 to fuse box 25 (or junction 49) is a new connection presented as part of the present invention to ensure that whenever the ignition key is in its On position there is a direct connection from the battery 17 available to all of the accessories fused through box 25. It may be pointed out here that while lead 21 is shown connected to the fuse box 25, it is only necessary that it extend to a common connection for the accessories ahead of their individual operating switches.

One accessory is shown as the vehicle lights 31, connected between its ground 33 and fuse box 25 including in series, the headlight switch 35. The other accessories are represented by the box 37 connected between its ground 39 and fuse box 25 including series connected accessory switch 41. Box 37 may comprise the horn, the radio, or any other accessory; and, any number of such individual accessories and operating switches will be found connected between the fuse box 25 and individual grounds such as 23 and 39.

The invention contemplates supplying B+ from battery 17 to any or all of the accessories independently of the position of ignition contact 11 so that the lights, horn, radio and other accessories may be switched on regardless of the ignition switch or key. This path comprises a power-sensing lead 45 including in series therein a single set of relay contacts 47, and it may be noted that lead 45 extends to a junction point 49 above the common connection or fuse box 25 for all of the accessories. Thus, whenever contacts 47 are closed B+ is available for actuation of any of the accessories by operation of its own accessory switch. For example, the lights 31 may be turned on by closure of switch 35 even in the absence of an ignition key.

Contacts 47 are closed upon energization of their relay coil 51 which has its upper lead 53 connected to the On contact 23 of the ignition switch. The lower lead 55 extends through an optional impedance or resistor 57 to ground 59. Also, there is provided a holding lead 61 connected between lead 53 of winding 51 and the lower contact 47.

The first time that the ignition key is switched to the On position, winding 51 is energized and its contacts 47 closed. Connection 61 holds winding 51 energized thereafter regardless of the condition of the ignition switch or the key. Only the battery decaying to the predetermined level will drop out winding 51 and contacts 47 to interrupt the power lead 45.

A feature of the invention resides in this holding arrangement coupled with the lead 53 to the On contact 23, because the entire electrical system including relay winding 51 is dropped out when the predetermined voltage is reached and there is no drain on the battery 17 whatsoever. Alternatively, winding 51 may directly parallel battery 17 without requiring the holding lead 61, but the trickle current through winding 51 would always be present even after the supply lead 45 was interrupted, and the battery would eventually be drained beneath the predetermined level. Thus, the preferred arrangement is shown in the FIGURE.

The trickle current is enabled by preferably employing a high-impedance winding 51 or alternatively an added impedance 57, e.g., of the resistance type, to reduce the current to a bare minimum, merely sufficient for holding contacts 47 closed.

The timer circuitry includes the timing capacitor 71, which can be connected to supply lead 45 over its lead 73 whenever pushbutton 75 is depressed. Even a momentary depression of pushbutton 75 serves to charge capacitor 71 to the battery voltage level. Upon release of the pushbutton 75, the capacitor discharges into a relay winding coil 77 which closes its contacts 79. This completes a circuit comprising lead 81 from power supply lead 45 directly to the lights 31 to energize the lights for a predetermined period of time, although light switch 35 is open. The time of energization is predetermined by the capacitor discharge in respect to the resistance of the winding 77 and these parameters may be set at the factory for a given period—1 minute, for example. Alternatively a low impedance shown as adjustable resistor 83 may be included in series with windings 77 to vary the RC time constant, thereby adjusting the predetermined time interval.

If the timer circuit is to be employed independently of the protective level circuit, then contacts 47 are eliminated, or alternatively lead 73 extends directly to battery 17.

What is claimed is:

1. Apparatus for use in connection with a vehicular electrical system having a source of voltage and one or more loads and including a battery connected ignition switch having an On contact comprising in combination, a power lead connected from the source for making source voltage available to one or more of said loads independently of said ignition switch; voltage-sampling means for interrupting the power lead when the voltage falls to a predetermined voltage level; timing means responsive to the voltage-sampling means for the direct application of voltage to one or more of said loads and for interrupting the direct voltage application after a predetermined time; and a connection from the On contact to make power available via the ignition switch to said one or more loads.

2. The apparatus of claim 1 wherein the voltage-sampling means comprises a relay winding connected to the On contact and having a pair of contacts for opening and closing said power lead.

3. The apparatus of claim 2 wherein said timing means comprises a capacitor and an interruptable connection between the capacitor and the power lead; a relay winding connected to be energized by the capacitor when said interruptable lead is closed and thereafter interrupted; and a further lead extending from the power lead to at least one of said loads, said relay winding having a pair of contacts connected to open and close said further lead to energize said one load during capacitor discharge.

4. Apparatus for use in connection with an ignition-type vehicular electrical system having a source of voltage and one or more loads comprising in combination, a circuit for connection between the battery and one or more loads comprising voltage-sampling means for interrupting said circuit at a predetermined voltage, and a bypass for said circuit effective when the ignition is on.

5. The apparatus of claim 4 wherein said voltage-sampling means comprises a relay winding having a pair of contacts to open said circuit when the voltage level of said source of voltage drops to a predetermined voltage level; and said winding being connected to the ignition.

6. The apparatus of claim 5 further comprising a lead from one of said contacts to said relay winding whereby said contacts serve as a holding connection for the relay winding.

7. The apparatus of claim 6 further characterized by impedance in said winding to reduce the current flow there through to a value sufficient to maintain the winding energized.

8. In a vehicular electrical system of the type having an On-Off ignition switch, a battery and a fuse box common to the accessory loads, the combination comprising a first connection from the battery to the fuse box, a second connection from the battery to the fuse box when the ignition switch is on regardless of whether the battery voltage level is above or below a predetermined level; and sensing means for opening one of said connections whenever the battery voltage drops to said predetermined level.

9. The combination of claim 8 comprising a third connection from said one of said connections directly to at least one of said accessory loads; and means for interrupting said third connection after a predetermined time from its initiation.

10. The combination of claim 9 wherein said means for interrupting comprises a capacitor, a further connection from said first connection to the capacitor; and a switch in said further connection closure of which enables the capacitor to be charged from the battery voltage.

11. The combination of claim 8 wherein the sensing means comprises a relay winding connected for initial energization when the ignition switch is on.

12. The combination of claim 11 wherein said sensing means further comprises a pair of contacts connected in said one of said connections and a holding connection from one of said contacts to said relay winding.

13. A sensing and protective circuit for use in connection with an ignition contact-type vehicular electrical system having a source of voltage and a common function or fuse box for a plurality of leads each having an On-Off switch comprising in combination, a separate ignition circuit from said source of voltage to said junction box; the ignition contacts of said vehicular electrical system being connected in said separate ignition circuit for interrupting and closing the same; a first electrical circuit connected between the source of voltage and said junction box; voltage-sampling means for interrupting said first electrical circuit when the voltage of said source falls to a predetermined voltage level; a second electrical circuit connected from said voltage-sampling means directly to at least one of said loads for applying voltage to said one load; and timing means for closing said second electrical circuit and for interrupting the second electrical circuit after a predetermined time to interrupt the voltage application to said one load.

14. The apparatus of claim 13 wherein said voltage-sampling means comprises relay coil means and a set of contacts responsive thereto; said contacts connected to interrupt said first electrical circuit when the source voltage falls to a voltage level insufficient to maintain said relay coil energized.

15. The apparatus of claim 14 comprising a circuit from one of said relay contacts to said relay coil for energizing the latter when the voltage-sampling means are closed.

16. The apparatus of claim 15 further comprising another electrical circuit from one of said ignition contacts to said coil means for ensuring energization of the coil means via the ignition means when the ignition means is closed.

17. The apparatus of claim 16 wherein said timing means comprises timing relay coil means and a set of timing relay contacts responsive thereto; said set of timing contacts being connected in said second electrical circuit for closing and interrupting the same in response to said timing relay coil means; and a still further connection from said timing relay coil means to said first electrical circuit on the load side of the set of relay contacts of said voltage-sampling coil means.

18. The apparatus of claim 17 further comprising capacitor means connected generally in parallel with said timing relay coil means; and manually operable switch means connected in said still further connection.

* * * * *